M. A. GULLICKSON.
BLADE AND CHAIN FIELD FLOAT.
APPLICATION FILED NOV. 10, 1914.
1,146,155.
Patented July 13, 1915.
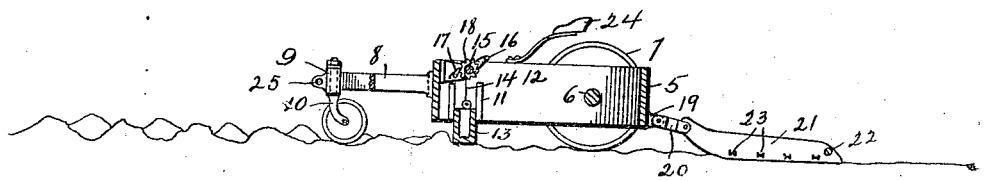
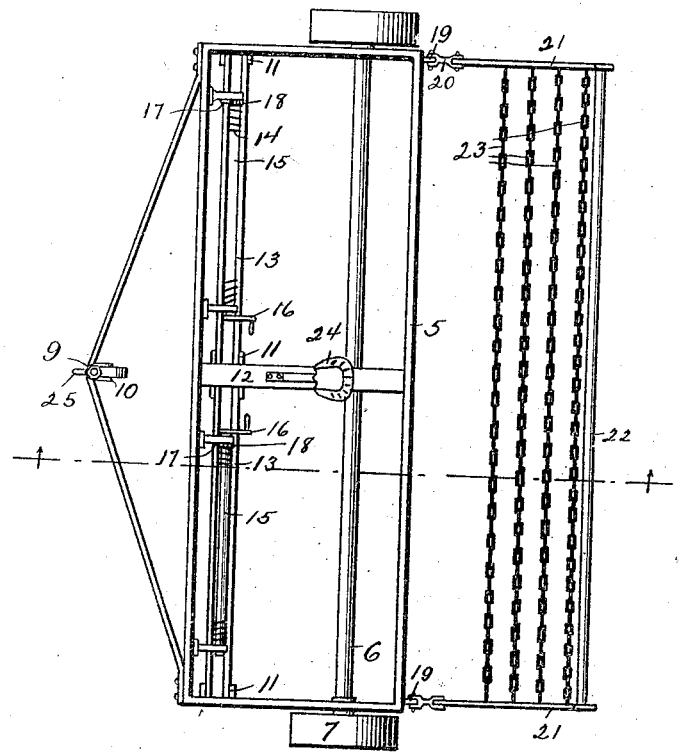
Witnesses
Inventor
M. A. Gullickson,
Samuel Herrick
Attorney

UNITED STATES PATENT OFFICE.

MARTIN A. GULLICKSON, OF BONETRAILL, NORTH DAKOTA.

BLADE-AND-CHAIN FIELD-FLOAT.

1,146,155.   Specification of Letters Patent.   Patented July 13, 1915.

Application filed November 10, 1914. Serial No. 871,270.

*To all whom it may concern:*

Be it known that I, MARTIN A. GULLICKSON, a native-born citizen of the United States, residing at Bonetraill, in the county of Williams and State of North Dakota, have invented certain new and useful Improvements in Blade-and-Chain Field-Floats, of which the following is a specification.

This invention relates to a blade and chain float for pulverizing and leveling plowed ground and it has for its object the provision of a simple and economical structure of the character described comprising a wheeled frame carrying vertically adjustable blades, together with means for raising and lowering the blades, said frame having connected thereto a float made of a plurality of strands of chain, the blades serving to break up the large clods of dirt and to partly level the ground and the chain float completing the work of pulverizing and leveling the ground.

Further objects and advantages of the invention will be set forth in the detailed description which now follows.

In the accompanying drawing: Figure 1 is a vertical, longitudinal sectional view of the invention, upon line 1—1 of Fig. 2, and Fig. 2 is a plan view.

Like numerals designate corresponding parts in both of the figures of the drawing.

Referring to the drawing the numeral 5 designates an open, rectangular frame that is supported upon an axle 6 which carries ground wheels 7. Braces 8 extend forwardly from the front corners of the frame and these braces are joined at 9. The forward ends of these braces carry a wheeled truck 10. Disposed within vertical guideways 11 carried by the frame and by a member 12, are rigid blades 13. These blades have flexible members 14, such as cables, attached to them which are wound upon rods 15 arranged to have movement imparted thereto by cranks 16 and held against reverse movement by pawls and ratchets 17 and 18; by virtue of which construction, the blades may be held in any vertically adjusted position. Pivoted to ears 19 formed at the rear corners of the frame 5 are clevis links 20 to the opposite ends of which runners 21 of the chain float are pivoted. These runners are connected by a tie bar 22 which holds the runners in proper spaced relation. Extending between and secured to these runners are chains 23. A seat 24 is mounted upon the device and the driver seated thereon may direct a team hitched to the structure at 25.

In operation, the blades 13 through the rods 15 are adjusted to the proper height and serve to initially crush large lumps and clods of earth, after which the chain float formed by runners 21, tie bar 22, and chains 23 is drawn over the initially crushed ground and the pulverizing thereof is completed.

While the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

1. In a device of the character described the combination with an oblong, rectangular supporting frame, of a cross bar, spanning the same midway between the ends thereof, guides carried by said cross bar and the ends of said frame, a pair of blades disposed for vertical movement in said guides, said blades lying in longitudinal alinement with each other upon opposite sides of said cross bar, brackets projecting rearwardly from the front of the supporting frame, horizontal rods journaled in said brackets, said rods over-lying said blades, handles for imparting rotation to said rods, pawl and ratchet connections between said rods and said brackets and flexible members connected to said blades and to said rods and by which the blades are raised and lowered when said rods are rotated.

2. In a device of the character described, the combination with a rectangular, wheeled supporting frame, of a cross member spanning said frame, guideways formed in said member and in the end members of the frame, blades disposed for vertical adjustment in said guideways and extending transversely of the line of travel, and means for raising and holding said blades in raised position.

In testimony whereof I have affixed my signature in the presence of two witnesses.

MARTIN A. GULLICKSON.

Witnesses:
C. A. M. SPENCER,
L. C. WILSON.